Figure 1:
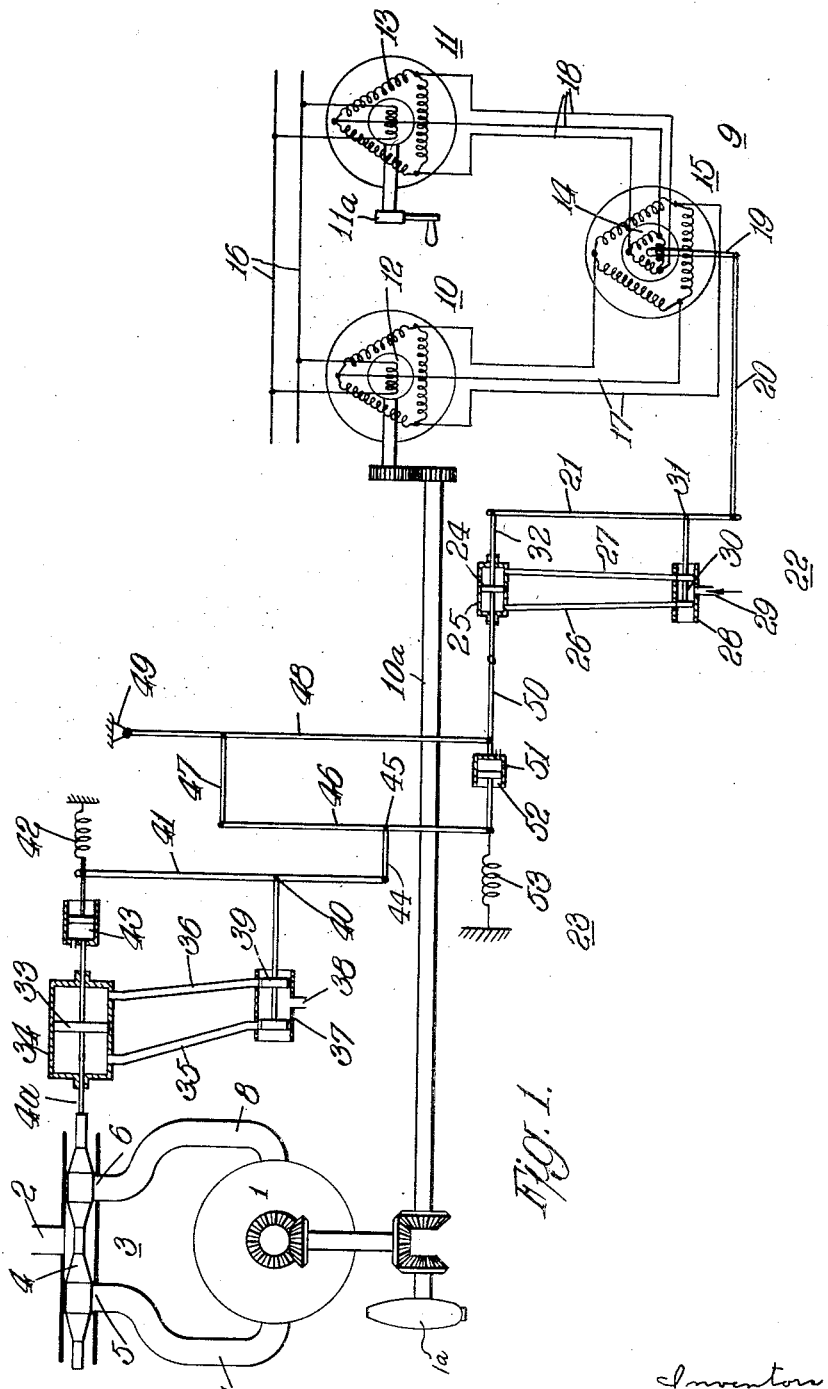

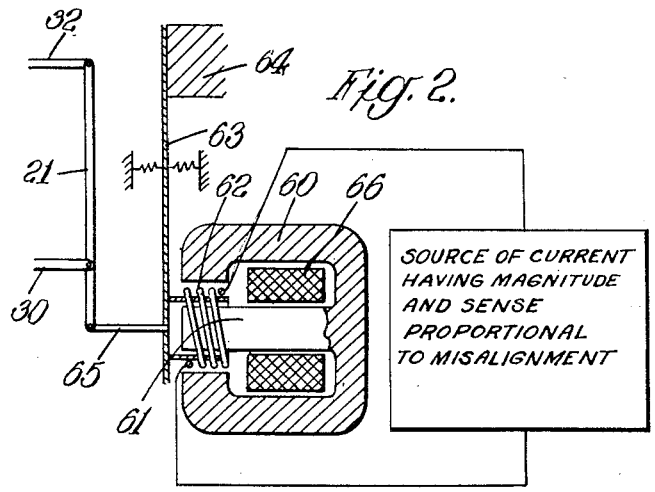
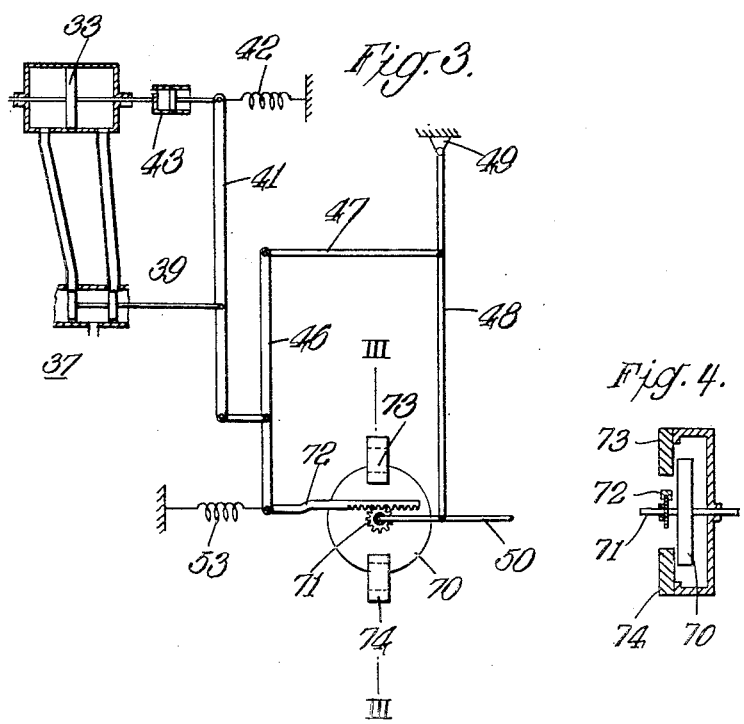

Patented Dec. 5, 1950

2,533,042

UNITED STATES PATENT OFFICE 2,533,042

POWER-DRIVEN ALIGNING MECHANISM CONTROL SYSTEM DEPENDENT UPON A TIME DERIVATIVE OF THE DISPLACEMENT

Reginald Alexander Polson, Flixton, Manchester, and Cecil Dannatt, Hale, England, assignors to Metropolitan-Vickers Electrical Company Limited, London, England, a company of Great Britain Application August 11, 1945, Serial No. 610,354
In Great Britain April 7, 1942

Section 1, Public Law 690, August 8, 1946
Patent expires April 7, 1962

6 Claims. (Cl. 121—41)

This invention relates to positional control systems for power-driven movable objects, of the kind in which the control system governs the torque applied to the movable object by a variable velocity motive equipment therefor under control of a movable directing member so that the movable object is caused to move correspondingly to and to be set in a final position corresponding to that of said directing member, the operation of said motive equipment being controlled by means responsive to the displacement of the movable object with respect to that position thereof corresponding with the position of said directing member. This displacement will hereinafter and in the appended claims be referred to for convenience as the displacement of the movable object with respect to the directing member, and in some instances simply as "the displacement."

An object of the present invention is to provide an improved positional control system of the kind above referred to which in particular will ensure that the movable object shall quickly follow the movements of the directing member and assume without impermissible "hunting" or self-sustained oscillation a final position in accurate correspondence with said directing member. The invention has also for its object to provide a positional control system in which the above advantages are obtainable with apparatus of a robust nature.

According to the present invention there is provided a positional control system comprising means responsive to displacement of the movable object with respect to a directing member therefor coupled with control means for determining the torque or speed applied to the movable object by the motive equipment for the latter, in which said displacement responsive means are arranged to cause displacement of an output element of said means in accordance with said displacement, and in which means are provided for deriving from the movement of said output element and imparting to said control means, in addition to a movement thereof dependent on the displacement between the movable object and directing member, a component or components of movement dependent on one or more time derivatives of the movement of said output element whereby the torque or speed applied to the movable object by the motive equipment therefor will contain a corresponding component or components in addition to a component dependent upon the displacement between the movable object and directing member.

As is known the operation of positional control systems of the kind referred to is improved by causing the movement of the movable object to depend upon one or more time derivatives of the displacement instead of merely upon the displacement. As is well understood where the torque or speed imparted to the movable object is controlled only in accordance with the displacement between the movable object and the directing member the control system will tend to restore alignment, but alignment will only be reached after a period of oscillation of the movable object about its position of alignment with the directing member. In some cases this tendency to oscillation will become so great as to be self-sustained. This tendency to oscillation, self-sustained or otherwise, may be overcome by causing the torque or speed applied to the movable object to contain a component dependent upon the relative velocity between said movable object and directing member, that is to say the first time derivative of the misalignment or displacement, said component acting in a direction to oppose relative velocity of the movable object with respect to the directing member.

The operation may also be improved particularly by the inclusion of a component in the torque or speed applied to the movable object corresponding with the second time derivative of the displacement, that is relative acceleration between the movable object and directing member. Such component improves the accuracy of alignment and the stability of control.

In order that the invention may be more clearly understood reference will now be made by way of example to the accompanying drawings, in which:

Fig. 1 is a diagram showing one arrangement of control system according to the invention, Fig. 2 is a fragmentary diagram referring to an alternative arrangement of displacement responsive means, Fig. 3 is a diagram illustrating a modified arrangement of part of the control system shown in Fig. 1, and Fig. 4 is a section on the line III—III of Fig. 3.

Referring first to Fig. 1, the arrangement is shown as applied by way of example to a control system for a power-driven movable object $1a$ in which the motive equipment for the latter comprises a hydraulic engine indicated diagrammatically at $1$ connected with the movable object and adapted to be supplied from a constant pressure variable delivery source of liquid (not shown) by way of a conduit 2 and a main control or throttle valve 3. The valve 3 of piston type comprises a movable piston member 4 co-operating with ports 5 and 6 which are connected by means of conduits 7 and 8 with two ports of the engine 1 which will produce torque in one direction or the other according to the direction of pressure difference below the conduits 5 and 6. By displacement of the member 4 to the left in Fig. 1 liquid will be supplied under pressure from the conduit 2 through the port 5 and conduit 7 to the hydraulic engine and will be discharged from the latter through the conduit 8 and port 6 of the throttle valve and the engine will therefore move the movable object in a corresponding direction. Movement of the member 4 in the other direction from the illustrated central position will cause liquid to be supplied to the hydraulic engine through the port 6 and conduit 8 and discharged from the engine through the conduit 7 and port 5 of the throttle valve and the hydraulic engine will thereby be caused to move the movable object in the opposite direction. The rate of supply of fluid to the hydraulic engine will depend upon the opening of the ports 5 and 6 by the throttle valve 3 and consequently will cause movement of the movable object 1a at a velocity dependent upon the displacement of the member 4 from its illustrated central position.

The hydraulic engine 1 and an associated constant pressure variable delivery pump constituting the source of supply of liquid to the conduit 2 thus constitutes a variable velocity ratio transmission between the driving shaft of said pump and the movable object. Said pump and engine may be in the form of the variable velocity ratio transmission known as the "VSC" gear, the hydraulic engine and pump both being of multicylinder kind and the fluid being circulated directly between the pump and engine.

In the control system shown in Fig. 1 the displacement responsive means indicated generally at 9 are shown by way of example as comprising a Selsyn system of the kind in which two Selsyn devices 10 and 11 have their rotors 12 and 13 coupled respectively with the directing member 11a and, through geared shafting 10a, with the movable object 1a. The Selsyn devices 10 and 11 are arranged to cause displacement of the rotor element 14 of a third Selsyn device 15 in accordance with the relative angular displacement of the rotors 12 and 13 from predetermined relative positions. In this system the rotors 12 and 13 are provided with single phase exciting windings which are connected across a common source of alternating current represented by the conductors 16. The stators of the devices 10 and 11 are provided with windings of the kind commonly employed for polyphase dynamo electric machines. The stator winding of the device 10 is connected by conductors 17 with a similar winding provided on the stator of the third Selsyn device 15 whilst the stator winding of the device 11 is connected by means of conductors 18 with a similar winding provided on the rotor 14 of the device 15. As is well known with the Selsyn system shown in Fig. 1 the rotor 14 will tend to be displaced from the initial position illustrated in a direction and to an extent dependent upon the angular displacement of the rotor 13 from the angular position corresponding with that of the rotor 12. Consequently the displacement of the rotor 14 will be dependent upon the displacement of the movable object with respect to the directing member.

The rotor shaft of the Selsyn device 15 has made fast thereto a crank arm 19 which is coupled by means of a link 20 with the lower end of a floating lever 21. This floating lever forms part of a fluid pressure servo mechanism designated generally at 22 by means of which the displacements of the rotor 14 are amplified for operation of a fluid pressure servo mechanism designated generally at 23 for controlling the opening of the throttle valve 3 in accordance with the displacement of the rotor 14 and first time derivative of said displacement as hereinafter described.

The fluid pressure servo mechanism 22 comprises a piston 24 working within a double-acting cylinder 25 having the two ends thereof connected by conduits 26 and 27 with respective ports of an auxiliary control valve 28 which is illustrated as of the piston type, whereby fluid pressure is adapted to be supplied from a suitable source (not shown) through a conduit 29 through the valve 28 to the cylinder 25. The piston member 30 of the valve 28 is arranged in its illustrated central position to obstruct the flow of pressure fluid from the conduit 29 to both ends of the cylinder 25 whereas movement of said piston member to the left will allow fluid to flow from the conduit 29 into the left-hand end of the cylinder thereby to urge the piston 24 to the right in the diagram and at the same time will allow discharge of liquid from the right-hand side of the piston 24 through the conduit 27. In a similar manner movement of the piston member 30 to the right of its illustrated position will result in movement of the piston 24 to the left in the diagram.

The piston member 30 is connected with an intermediate point 31 of the floating lever 21, the upper end of which is pivotally connected with a piston rod 32 carrying the piston 24. As hereinafter described in more detail the floating lever 21 results in the piston 24 being caused to assume a position in the range of its travel which is displaced from the illustrated central position of said piston by an amount dependent in sense and magnitude on the sense and magnitude of displacement of the rotor 14 from its illustrated central position.

The piston rod 32 is arranged to control the opening of the throttle valve 3 by the mechanism 23 now to be described. The piston member 4 of the throttle valve 3 is connected with a piston rod 4a carrying a piston 33 working within a double-acting cylinder 34. The two ends of this cylinder 34 are connected by means of respective conduits 35 and 36 with ports of a control valve 37 which is again shown as of the piston type and arranged to govern the supply of pressure liquid to the cylinder 34 from a conduit 38 which is connected with the source of liquid under pressure. In its illustrated central position the piston member 39 of the control valve 37 obstructs the flow of pressure liquid from the conduit 38 to both ends of the cylinder 34 whereas displacement of said piston member 39 to the left in the diagram will allow liquid to flow under pressure through the conduit 35 into the left-hand end of the cylinder 34 and thereby cause movement of the piston 33 to the right in the diagram, liquid being discharged from the right-hand end of the cylinder 34 through the conduit 36. In a similar manner displacement of the piston member 39 to the right of its illustrated position will result in movement of the piston 33 to the left in the diagram.

The piston member 39 is pivotally connected with an intermediate point 40 of a floating lever 41, the upper end of which is constrained by means of spring means indicated diagrammatically at 42 so as normally to assume the illustrated position, the spring means resisting displacement of said upper end of the floating lever in either direction from the illustrated position. This end of the floating lever is connected with the piston rod 4a by means of a dashpot 43 and the arrangement is thus such that the piston 33 will be moved in one direction or the other at a speed dependent upon the displacement of the lower end of the floating lever 41 from the illustrated central position.

The lower end of the floating lever 41 is connected by means of a link 44 with an intermediate point 45 of a further floating lever 46. The upper end of this lever 46 is connected by means of a link 47 with a lever 48 pivotally mounted on a fixed pivot at 49. The lower end of the lever 48 is connected by means of a link 50 with the piston rod 32, said link 50 also carrying one element of a dashpot or other damping device 51 producing a force which is proportional or otherwise varies with the velocity of relative movement of the two elements thereof. The other element of the dashpot or damping device, such as the piston 52, is connected with the lower end of the floating lever 46, which end is biased to its illustrated central position by spring means shown diagrammatically at 53.

In the operation of the arrangement shown in Fig. 1, upon displacement of the movable object from the position corresponding with that of the directing member the rotor 14 will be displaced from its illustrated position, thereby to effect a movement of the lower end of the floating lever 21, and consequently an opening of the control valve 28, which will cause a corresponding movement of the piston 24 until the upper end of the floating lever has been moved in the opposite direction to the lower end thereof by an amount sufficient to reclose the valve 28. By this means the piston 24 is caused to apply to the link 50 a displacement which is an amplification without appreciable time lag of the displacement of the lever 19 and from which considerably greater forces than those available from the Selsyn system are obtained for application to the control valve 37. The movement of the piston 24 causes corresponding movement of the lever 48. This movement is applied directly to the upper end of the floating lever 46 by means of the link 47 and is applied to the lower end of the floating lever 46 through the dashpot device 51. The force produced between the two elements of said device is dependent upon the rate of change of relative position of said two elements so that said dashpot device will cause a displacement of the lower end of the floating lever 46 against the biasing force provided by the spring means 53 which is dependent upon the velocity of the piston 24, and therefore of the velocity of the lever 19, or, in other words, upon the rate of change of displacement of the movable object with respect to the directing member. Consequently the intermediate point 45 of the floating lever 46 will execute a movement which corresponds with the sum of the displacement of the movable object with respect to the directing member and the first time derivative of said displacement.

The movement of the intermediate point 45 is applied to the lower end of the floating lever 41, and therefore operates to cause movement of the piston 33 at a velocity dependent upon the sum of the displacement and the first time derivative thereof, which movements of the piston 33 are applied to the control valve 4, thereby to control the rate of supply of liquid to the engine 1.

Since the velocity of the hydraulic engine 1, and therefore the velocity of the movable object, is proportional to the rate of supply of liquid thereto and said rate of supply is dependent upon the displacement of the main control valve 4 from its illustrated position, said movement of the valve 4 by the piston 33 at a velocity dependent upon the sum of displacement between the movable object and directing member and the first time derivative of said displacement will result in a rate of change of velocity, or acceleration, of the movable object dependent on said sum. Consequently the torque applied by the hydraulic engine to the movable object will include components dependent on the sum of the displacement between the movable object and directing member and the first time derivative of said displacement. The relative values of these components will be dependent on the proportions of the linkage comprising the levers 41, 46 and 48 and on the stiffness of the spring 42 and dashpot 43 and the spring 53 and dashpot 52. By suitable choice of these factors the equipment may be caused to move the movable object into alignment with the directing member rapidly and without impermissible hunting.

Fig. 2 shows diagrammatically part of an alternative Selsyn system responding to the displacement between the movable object and directing member. The arrangement of Fig. 2 comprises a moving coil relay device consisting of a pot magnet 60 with an internal core 61 providing an annular air gap in which a coil 62 is axially movable, said coil being carried by a blade spring 63 secured at its upper end to a fixed part 64 of the device. The free end of the spring 63 is connected by a link 65 with the lower end of the floating lever 21 associated with the control valve 28 and piston 24 of Fig. 1. The pot magnet is provided with means such as an exciting coil 66 for causing flux to pass across the annular air gap whereby the device will produce on the lower end of the blade spring 63 a force dependent upon the current supplied to the coil 62 and consequently will cause a deflection of the spring 63, and thereby a movement of the lower end of the floating lever 21 which is dependent upon said current. The moving coil 62 is connected in circuit with means responsive to the displacement between the movable object and directing member so that the resultant ampere turns produced by the coil 62 are dependent in magnitude and sense on the magnitude and direction of said displacement. For example, said coil 62 may be connected in a system comprising Selsyn devices and dry-plate rectifiers.

Referring now to Fig. 3, which shows a modification of the mechanism designated 23 in Fig. 1, the dashpot device 51 of said figure is replaced by means for introducing into the velocity of the piston 33 a further component dependent on the second time derivative of the displacement between the movable object and directing member. These means comprise a disc 70 having appreciable moment of inertia made fast to a spindle journalled in bearings mounted on the end of the link 50. This spindle also has made fast to it a pinion 71 meshing with rack teeth formed on a link 72 pivotally connected with the lower end of the lever 46. Means are provided for producing on the disc 70 a damping or braking torque dependent on the speed of rotation thereof. For example, fluid frictional means may be employed for braking said disc, or, as is illustrated in Fig. 3, the disc is arranged for rotation between the poles of permanent or electromagnets 73 and 74 disposed diametrically opposite one another with respect to the disc, the latter being of electrically conducting material.

In the operation of the arrangement shown in Fig. 3 movements of the piston 24 (Fig. 1) in accordance with the displacement between the movable object and directing member are transferred directly to the lever 41 by the lever 48, link 47 and floating lever 46 as in the arrangement of Fig. 1. At the same time the movements of the piston 24 cause corresponding translational movements of the spindle carrying the disc 70. These translational movements are transmitted to the toothed rack 72 and thereby to the lower end of the floating lever 46. Due to the biasing force of the spring means 53 such translational movements will result in a rotational movement of the spindle 71. The disc remains in rotational equilibrium due to the damping force which is set up by this rotation thereof between the poles of the permanent magnets 73 and 74, the inertia force due to the rotation of said disc, and the stress of the spring means 53. The link 72 therefore receives a motion which contains components dependent on the first and second time derivatives of the movement of the link 50, which components are added to the motion of the lever 41. Where the second time derivative of the displacement is not required the disc may be provided with negligible moment of inertia so as to constitute a damping device providing operation similar to the dashpot device shown in Fig. 1.

It will be understood that the arrangement of displacement responsive means, first and second fluid servo mechanisms and coupling means between the latter arranged in combination with one another as above described, are applicable also to arrangements in which the movable object is driven by a variable speed motive equipment of any other suitable form, said motive equipment being provided with control means which are coupled with the piston of the second fluid servo mechanism and the displacement responsive means shown may be replaced by any other suitable form of such means of electrical or other kind.

What we claim is:

1. In a positional control system for maintaining a heavy movable object in predetermined positional correspondence with the position of a capriciously and easily movable directing member, the combination including said directing member, said movable object, a variable velocity motive equipment for driving said movable object, displaceable control member operatively connected to said motive equipment so that the output velocity of said motive equipment varies in dependence upon the position of said control member, and mechanism for transmitting to said control member a displacement depending upon the misalignment that may exist between said movable object and said directing member, said mechanism including a damping device which experiences said displacement and which is actuated to a degree depending upon the speed of said displacement and a secondary motion transmission means connecting said damping device to said control member for transmitting movements to said control member according to the degree of actuation of said damping device, whereby said control member is subject not only to said displacement but also to a movement depending upon the first time derivative of said displacement.

2. The combination of claim 1 in which the damping device has an inertia force resisting actuation, whereby the transmitted movement from said damping device has a component proportional to the second time derivative of the displacement.

3. The combination of claim 1 in which the damping device consists of a dash-pot and plunger system, one element of said system experiencing the displacement and the other element of said system being movable from the unactuated position only against resilient opposition, whereby movement of said other element depends upon the rate of displacement of said first mentioned element.

4. The combination of claim 1 in which the damping device consists of a mechanical pair including a rack on one member thereof and a pinion on the other member thereof arranged so that translative displacement of one of said members tends to rotate said pinion by interaction with said rack, said pinion being associated with means for resisting the rotation thereof to an extent depending on the speed of said rotation, whereby the output translative displacement of one of said members produced by an initiating translative displacement of the other of said members depends upon the rate of said initiating displacement.

5. The combination of claim 4 in which the pinion is also associated with means for resisting the rotation thereof to an extent depending upon the acceleration of said rotation, whereby the output displacement depends additionally upon the second time derivative of the initiating displacement.

6. The combination of claim 1 in which the mechanism for transmitting a displacement includes a movable element of an electric device coupled mechanically to the directing member, a second movable element of an electric device coupled mechanically to the movable object, an electric circuit associated with said movable elements for producing a current proportional in sense and magnitude with the misalignment of said elements, and a moving coil relay device receiving said current, said coil being arranged to transmit its displacement to the control member and the damping device.

REGINALD ALEXANDER POLSON.
CECIL DANNATT.

REFERENCES CITED

The following references are of record in the file of this patent:

UNITED STATES PATENTS

| Number | Name | Date |
|---|---|---|
| 1,612,118 | Hewlett | Dec. 28, 1926 |
| 2,020,847 | Mitereff | Nov. 12, 1935 |
| 2,376,359 | Hultin | May 22, 1945 |
| 2,408,069 | Hull | Sept. 24, 1946 |
| 2,409,190 | Brown | Oct. 15, 1946 |
| 2,414,690 | Edwards | Jan. 21, 1947 |

Certificate of Correction

Patent No. 2,533,042 December 5, 1950

REGINALD ALEXANDER POLSON ET AL.

It is hereby certified that the above numbered patent was erroneously issued to "Metropolitan-Vickers Electrical Company Limited, of London, England, a company of Great Britain", as assignee, whereas said patent should have been issued to *Metropolitan-Vickers Electrical Company Limited, of London, England, and Vickers-Armstrongs Limited, of London, England, both companies of Great Britain, as assignees*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*